(12) United States Patent
Stöttinger et al.

(10) Patent No.: US 12,335,307 B2
(45) Date of Patent: Jun. 17, 2025

(54) EDGE-BASED DECENTRALIZED INTRUSION AND ANOMALY DETECTION

(71) Applicant: Continental Automotive Technologies GmbH, Hannover (DE)

(72) Inventors: Marc Sebastian Patric Stöttinger, Oestrich-Winkel (DE); Andreas Andrae, Frankfurt am Main (DE); David Gonzalez Gonzalez, Egelsbach (DE); Osvaldo Gonsa, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/798,741

(22) PCT Filed: Jan. 21, 2021

(86) PCT No.: PCT/EP2021/051260
§ 371 (c)(1),
(2) Date: Aug. 10, 2022

(87) PCT Pub. No.: WO2021/160395
PCT Pub. Date: Aug. 19, 2021

(65) Prior Publication Data
US 2023/0344870 A1 Oct. 26, 2023

(30) Foreign Application Priority Data
Feb. 11, 2020 (EP) .................... 20156634

(51) Int. Cl.
*H04L 29/06* (2006.01)
*G06F 21/00* (2013.01)
(Continued)

(52) U.S. Cl.
CPC ......... *H04L 63/1491* (2013.01); *H04W 12/12* (2013.01)

(58) Field of Classification Search
None
See application file for complete search history.

(56) References Cited

U.S. PATENT DOCUMENTS

2014/0250531 A1 9/2014 Moeller
2015/0113568 A1* 4/2015 Lee .................... H04N 21/4332
725/47
(Continued)

FOREIGN PATENT DOCUMENTS

CN 1679266 A 10/2005
CN 101465770 A 6/2009
(Continued)

OTHER PUBLICATIONS

Yan Chu-Jiang et al., "Intrusion detection for engineering vehicles under the electric transmission line based on deep learning", 2017 8th IEEE International Conference on Software Engineering and Service Science (ICSESS), Date of Conference: Nov. 24-26, 2017, DOI: 10.1109/ICSESS.2017.8342861 and machine translation of same.
(Continued)

*Primary Examiner* — Lisa C Lewis (57) ABSTRACT

This patent application is directed to a method for detecting intrusions and anomalies, an intrusion and anomaly detecting edge computing unit, and a system for detecting intrusions and anomalies.

15 Claims, 2 Drawing Sheets

(51) Int. Cl.
   *H04L 9/40*     (2022.01)
   *H04W 12/12*    (2021.01)

(56) References Cited

U.S. PATENT DOCUMENTS

| | | | |
|---|---|---|---|
| 2017/0286675 | A1 | 10/2017 | Shin |
| 2018/0255082 | A1 | 9/2018 | Ostergaard |
| 2020/0053026 | A1* | 2/2020 | Rangachari ............ H04L 45/44 |
| 2022/0126862 | A1* | 4/2022 | Xiao ................ B60W 50/0205 |

FOREIGN PATENT DOCUMENTS

| | | | |
|---|---|---|---|
| CN | 102467820 | A | 5/2012 |
| CN | 105577685 | A | 5/2016 |
| CN | 106647724 | A | 5/2017 |
| CN | 106899614 | A | 6/2017 |
| CN | 107948172 | A | 4/2018 |
| CN | 108111510 | A | 6/2018 |
| CN | 109005173 | A | 12/2018 |
| CN | 109040019 | A | 12/2018 |
| CN | 110034968 | A | 7/2019 |
| CN | 110224990 | A | 9/2019 |
| CN | 110463142 | A | 11/2019 |
| CN | 110474866 | A | 11/2019 |
| EP | 3370389 | A1 | 9/2018 |

OTHER PUBLICATIONS

Raza Salman et al. "A Survey on Vehicular Edge Computing: Architecture, Applications, Technical Issues, and Future Directions", Wireless Communications and Mobile Computing, vol. 2019, pp. 1-19, XP055794834, DOI: 10.1155/2019/3159762 Retrieves from the Internet: URL:http://downloads.hindawi.com/journals/wcmc/2019/3159762.XML (retrieves on Apr. 13, 2021), Abstrct, Sections 1 and 2, Feb. 24, 2019.

Sparsh Sharma et al. "A survey on Intrusion Detection Systems and Honeypot based proactive security mechanisms in VANETs and VANET Cloud", Vehicular Communications, vol. 12, pp. 138-164, XP055536087, DOI: 10.1016/j.vehcom.2018.04.005, Apr. 1, 2018.

Yan Qiao et al. "A Multi-Level DDOS Mitigation Framework for the Industrial Internet of Things", IEEE Communications Magazine, IEEE Service Center, vol. 56, No. 2, pp. 30-36, XP011677153, DOI: 10.1109/MCOM.2018.1700621 (retrieves on Feb. 13, 2018), Feb. 1, 2018, Piscataway, New Jersey, USA.

Sohal Amandeep Singh et al. "A cybersecurity framework to identify malicious edge device in fog computing and cloud-of-things environments", Computers & Security, vol. 74, pp. 340-354, XP055794275, NL, DOI:10.1016/j.cose.2017.08.016, May 1, 2018, Netherlands.

International Search Report and Written Opinion dated Apr. 22, 2021 from corresponding International patent application No. PCT/EP2021/052160.

Chinese First Office Action dated Sep. 15, 2023 for the counterpart Chinese Application No. 202180017580.3 and translation of same.

Office action date Mar. 29, 2024 of the counterpart WOCN application No. 202180013831.0.

Chinese Notice of Allowance dated Aug. 2, 2024 for the counterpart Chinese Patent No. 202180013831.0 and machine translation of same.

Vasilly Krundyshev et al., "Artificial swarm algorithm for VANET protection against routing attack", 2018 IEEE Industrial Cyber-Physical Systems (ICPS), Date of Conference: May 15-18, 2018, DOI: 10.1109/ ICPHYS.2018.8390808. Cited in NPL Cite No. 1.

Wang Junjian et al., "Automatic detection system for abnormal events on highways in PTZ scenarios", China Academic Journal Electronic Publishing House, www.cnki.net, 2018 and machine translation of same. Cited in NPL Cite No. 1.

EP Examination Report dated Apr. 8, 2025 for the priority European Patent Application 21 701 310.1.

* cited by examiner

EDGE-BASED DECENTRALIZED INTRUSION AND ANOMALY DETECTION

BACKGROUND

The invention is directed to a method for detecting intrusions and anomalies, an intrusion and anomaly detecting edge computing unit, and a system for detecting intrusions and anomalies. Fixed, rule-based schemes are used to detect and locally log intrusion attempts as well as anomalies in ECU (ECU: Electronic Control Unit) behavior and/or operation in an in-vehicle network of a vehicle. Typically, local, on-board analysis methods in the in-vehicle network are based on pre-configured and/or pre-learned rule set. The results of the on-board analysis or raw log file data can also be transferred to a backend system, e.g., a centralized backend server, for detailed analysis as soon as connectivity is available or as configured. Then, the centralized backend server has to analyze all received logs and to provide incident reports to a responsible security advisor. In some cases, the entire vehicle sensor and monitoring data for intrusion and anomaly detection is sent to the backend system for further analysis. Depending on the type and severity of findings countermeasures have to be triggered and the deployment of counter actions, the countermeasures, have to be coordinated by a central management entity, e.g., the backend system. Countermeasures, like SW updates (SW: Software), isolation of infected vehicles and/or tracing of attackers, can be put into actions for dedicated vehicles or entire vehicle fleets.

One vehicle alone neither exhibits sufficient processing capabilities nor possess all information to establish an overall picture of attack patterns. Thus, more processing power and data aggregation from different sources is needed.

For analysis on the backend side, the backend system, e.g., the centralized backend server has to aggregate and analyze all data from connected vehicles. Thus, it may easily become the bottleneck given growing complexity of analysis for intrusion and anomaly detection as well as data flood of files to be populated via different networks to the centralized backend system. This may further result in increased latencies in the entire processing chain, including data sensing, aggregation, analysis, selection of appropriate countermeasures, and countermeasure enforcement.

A centralized approach might lack of scalability and efficiency. Since complex attack scenarios with multiple different, globally distributed attacks might occur in parallel, a central entity might not be able to handle these situations in an optimum way, e.g., because of limited bandwidth and prioritization issues.

US 2018255082 A1 is generally directed to vehicle systems, and more specifically, to cloud-edge vehicle anomaly detection. The cloud-edge vehicle anomaly detection system known from US 2018255082 A1 comprises a vehicle edge platform configured to communicate with other vehicle edge platforms and with a centralized cloud. Each of the vehicle edge platforms comprises a memory for managing analyzation models. A processor in the vehicle edge platform is configured to execute a respective analysis model on received data to generate an anomaly determination of received data. The cloud known from US 2018255082 A1 is configured to receive raw data from vehicles and/or reports from vehicles with regard to analyzed data. Additionally, the cloud is configured to distribute updates to the vehicle edge platforms, e.g., for an update of analysis models. The cloud further comprises the same functions as the vehicle edge platform, i.e., a management function for managing analyzation models and an analyzation function for analyzing received data for anomalies. Results of the analyzations are distributed in form of reports between edge vehicle platforms, from edge vehicle platforms to cloud and from cloud to edge vehicle platforms.

However, still the system known from US 2018255082 A1 lacks from enough processing power and data aggregation. Furthermore, the backend system in US 2018255082 A1, i.e., the cloud, may still become the bottleneck, since it still receives to many data, e.g., raw data, from vehicles. Moreover, the solution known from US 2018255082 A1 only allows for an anomaly detection in vehicles.

BRIEF SUMMARY

It is therefore an object of the invention to overcome at least one of the afore-mentioned problems.

This is achieved by a method, an intrusion and anomaly detecting edge computing unit and a system according to the independent claims.

The dependent claims include advantageous further developments and improvements of the present principles as described below.

A first aspect of the invention is directed to a method for detecting intrusions and anomalies, which method is performed by an intrusion and anomaly detecting edge computing unit. The intrusion and anomaly detecting edge computing unit is coupled together with at least one further intrusion and anomaly detecting edge computing unit. The at least two intrusion and anomaly detecting edge computing units form a plurality of coupled distributed intrusion and anomaly detecting edge computing units. The plurality of coupled distributed intrusion and anomaly detecting edge computing units are part of an edge cloud. The edge cloud comprising distributed intrusion and anomaly detecting edge computing units can thus be regarded as an intrusion and anomaly detecting edge cloud.

The method comprises, transmitting and receiving data to and from other entities being temporarily or permanently coupled to said edge cloud. It is understood that the intrusion and anomaly detecting edge computing unit may communicate with other entities connected to the edge cloud to which also the respective intrusion and anomaly detecting edge computing unit is connected. Preferably, the intrusion and anomaly detecting edge computing units are deployed as part of the mobile network infrastructure, e.g., the IT and telecommunications infrastructure, or transport infrastructure. More precisely, the intrusion and anomaly detecting edge computing units can for example be deployed at wireless access points, infrastructure routers or gateways, network aggregation points, data centers or core network sites. Moreover, in envisioned "smart cities", infrastructure units such as traffic lights, lamp posts, toll, traffic sign gantries, or units collocated with other smart sensors, e.g., camera systems, will be connected together and intrusion and anomaly detecting edge clouds may advantageously be deployed or introduced in respective infrastructure units. By that it is possible that the respective edge computing units are deployed close, in terms of latencies, to other entities, especially to vehicles and to other mobile entities, which need to be protected from intrusions and/or anomalies. For example, other entities may be at least one of a said infrastructure unit, such as traffic lights, lamp posts, toll, traffic sign gantries, or units collocated with other smart sensors, e.g., camera systems. Furthermore, other entities may also be vehicles and/or parts of vehicles, such as an in-vehicle network and/or a part of an in-vehicle network, such as an ECU. Thus, by the described method, it becomes not only possible to protect vehicles or respective parts of vehicles with respect to anomalies and/or intrusions in received data but also to protect, e.g., said infrastructure units. However, also further intrusion and anomaly detecting edge computing units and a centralized cloud may count as other entities.

The method further comprises, pretending, by an intrusion and anomaly detecting edge computing unit, of being at least one entity of a plurality of other entities being temporarily or permanently coupled to said edge cloud. By pretending of being at least one entity of a plurality of other entities being temporarily or permanently coupled to said edge cloud, the intrusion and anomaly detecting edge computing unit receives data transmitted in said edge cloud that is intended for being transmitted to the said at least one entity of the plurality of other entities being temporarily or permanently coupled to said edge cloud. In other words, the edge computing entity, by pretending of being at least one entity of a plurality of other entities being temporarily or permanently coupled to said edge cloud, receives the data to be transmitted to the entity that the edge computing entity pretends to be. This has the advantage of receiving data potentially comprising anomalies and/or intrusions at an early stage, e.g., in the case of a targeted cyber-attack ideally before attack data reaches its target. This data may either be further transmitted to the intended recipient in parallel, or it may be delayed until an analysis is performed by the pretending unit, or at least an intermediate result of said analysis is available. As the pretending unit does not perform the task of the intended unit, e.g., does not trigger/ignite an airbag, even a successful (an un-detected) intrusion would not cause harm, if it was successful only at the pretending unit, but not on the originally intended unit. In case of an unintended result, e.g., ignition of an airbag, the delayed data will not be further provided to the originally intended unit. In case of parallel transmissions, a countermeasure might be in the example of an airbag, to inactivate the airbag before it is ignited. This should be possible, if the pretending unit acts sufficiently fast.

The method further comprises, analyzing received data for detecting anomalies and intrusions in the received data. In addition to pretending of being at least one entity of a plurality of other entities being temporarily or permanently coupled to said edge cloud, it is thus possible to detect anomalies and/or intrusions received in data at an early stage. In addition, the danger of a bottleneck by transferring too much data to a centralized cloud is avoided. The described method further enables for a misbehavior detection, e.g., to detect malfunctions and/or malicious behavior of other entities.

If an anomaly and/or intrusion is detected in the received data, the method further comprises, storing information about the detected anomaly and/or intrusion and transmitting information about the detected anomaly and/or intrusion to at least one other anomaly and intrusion detecting edge-computing unit of said edge cloud. This bears the advantage to share information about anomalies and/or intrusions with other anomaly and intrusion detecting edge computing units of one edge cloud. Ideally, all anomaly and intrusion detecting edge computing units receive the respective information. It is understood that the other anomaly and intrusion detecting edge computing unit may store the received information.

In an embodiment of the present invention, the method comprises: using stored information in analyzing received data by taking stored information into account for detecting anomalies and intrusions in received data. This bears the advantage of reducing processing time while analyzing received data. An anomaly and/or an intrusion may thus be detected faster.

In an embodiment of the present invention, analyzing received data comprises: comparing data received from at least two other entities being temporarily or permanently coupled to said edge cloud. This has the advantage that anomalies and/or intrusions can be detected by comparing data originating from different sources, which would not have been detected when analyzing the data individually.

It is understood that if in the comparison of the received data an anomaly and/or intrusion is detected, the method may comprise: storing information about the detected anomaly and/or intrusion and transmitting information about the detected anomaly and/or intrusion to at least one other anomaly and intrusion detecting edge-computing unit of said edge cloud.

In an embodiment of the present invention, the method comprises: deriving an attack pattern from analyzed data, e.g., in a distributed manner via the edge computing units. It is understood that such an embodiment comprises: storing the attack pattern as information or as part of the information about the detected anomaly and/or intrusion and transmitting the attack pattern as information or as part of the information about the detected anomaly and/or intrusion to at least one other anomaly and intrusion detecting edge computing unit of said edge cloud. Derived attack patterns may, thus, be used in analyzing received data by taking stored information into account for detecting anomalies and intrusions in received data. This bears the advantage that for example complex correlations in received data with regard to anomalies and/or intrusions can be found. Furthermore, complex correlations in received data with regard to anomalies and/or intrusions can be found faster. By transmitting the attack pattern such information is shared with further intrusion and anomaly detecting edge computing units, which further enhance the possibility of detecting intrusions and anomalies faster.

In an embodiment of the present invention, the method comprises: using code comprising artificial intelligence based algorithms and/or using code comprising reinforcement learning based algorithms. It is understood that code comprising the AI (AI: artificial intelligence) based algorithm and/or code comprising the reinforcement learning based algorithms may be advantageously used with regard to the invention. For example, by using AI based algorithms the detection of anomalies and/or intrusions may be more efficient and faster. Moreover, for example, deriving attack patterns from analyzed data may be faster, the derived attack patterns may have a higher precision. The efficiency of how to store information about the detected anomaly and/or intrusion may be for example enhanced. The usage of stored information in analyzing received data by taking stored information into account for detecting anomalies and intrusions in received data may be more efficient by using AI based algorithms. Furthermore, e.g., the transmission of information about the detected anomaly and/or intrusion to at least one other anomaly and intrusion detecting edge-computing unit may be managed in a more efficient way by using AI based algorithms. AI based algorithms together with reinforcement learning may continuously improve detection models and attack patterns as well as countermeasures. Compared to traditional supervised machine-learning reinforcement learning does not need a dedicated labeling of the important learning features in the training phase.

In an embodiment of the present invention, the method comprises: using stored information to derive new attack patterns and if a new attack pattern is derived from stored information, storing the new attack pattern and transmitting the new attack pattern to at least one other anomaly and intrusion detecting edge-computing unit of said edge cloud. This embodiment bears the advantage that new attack patterns may be learned from stored information. For example, ways on how to detect anomalies and/or intrusions may thus develop with time, e.g., similarly as intrusion tactics may develop over time. Transmitting the new attack pattern is used to share respective information with further intrusion and anomaly detecting edge computing units, which further enhance the possibility of detecting intrusions and anomalies faster.

In an embodiment of the present invention, the method comprises: at least one of the distributed intrusion and anomaly detecting edge computing units in said edge cloud enforcing a countermeasure based on the detected anomaly and/or intrusion. It is understood that the anomaly and intrusion detecting edge computing unit for enforcing the countermeasure may use a stored countermeasure. For example, the countermeasure may be stored in such a way that it directly shows for which detected anomaly and/or intrusion the respective countermeasure may be used.

In an embodiment of the present invention, the countermeasure is at least one of isolation of at least one of the other entities being identified as infected entity and/or as source of infecting data, containment of at least one of the other entities being identified as infected entity and/or as source of infecting data, block signals of at least one of the other entities being identified as infected entity and/or as source of infecting data, reporting at least one of the other entities being identified as infected entity and/or as source of infecting data by transmitting respective data to further edge computing entities and/or to the centralized cloud, isolation of one or more communication channels of at least one of the other entities being identified as infected entity and/or as source of infecting data, marking at least one of the other entities being identified as infected entity and/or as source of infecting data.

In an embodiment of the present invention, the method comprises: if a certain first time limit and/or a certain first computational load limit is exceeded during the analysis of the received data, sharing computing power with at least one further intrusion and anomaly detecting edge computing unit of said edge cloud for analyzing received data together. This bears the advantage that further intrusion and anomaly detecting edge computing units may be involved in analyzing received data. This may be especially advantageous if for example the involved further intrusion and anomaly detecting edge computing unit has further information about the received data, for example because it knows an attack pattern that suits to the respective received data. Thus, for example, a result may be reached quicker.

In an embodiment of the present invention, the method comprises: if a certain second time limit and/or a certain second computational load limit is exceeded during the analysis of the received data, forwarding preprocessed data to a centralized cloud. This bears the advantage that the centralized cloud only receives preprocessed data and no raw data, which reduces the amount of data transmitted to the centralized cloud. Furthermore, too much blocking of computing power on this part of the cloud can be prevented.

In an embodiment of the present disclosure, the method comprises transmitting and receiving data to a centralized cloud. It is understood that data transmitted to the cloud comprises preprocessed data. Receiving data from the centralized cloud bears the advantage that in addition data, for example, information about anomalies and/or intrusions, may be received from the cloud, e.g., information received by analyzing preprocessed data. Furthermore, the cloud may transmit updates, e.g., updates for attack patterns, for countermeasures, etc., to the intrusion and anomaly detecting edge computing units. Thus, the behavior and performance of intrusion and anomaly detecting edge computing units and thus of a respective edge cloud can be improved.

The features and advantages as described above for the method are also applicable for an intrusion and anomaly detecting edge computing unit described in the following.

A second aspect of the invention is directed to an intrusion and anomaly detecting edge computing unit configured to perform the method as described above.

A third aspect of the invention is directed to an intrusion and anomaly detecting edge computing unit coupled together with at least one further intrusion and anomaly detecting edge computing unit.

The at least two intrusion and anomaly detecting edge computing units form a plurality of coupled distributed intrusion and anomaly detecting edge computing units that are part of an edge cloud or part of a plurality of operatively connected edge clouds, i.e., a federation of edge cloud systems.

The edge computing unit comprises a communication interface, a memory and a processor. The communication interface can be regarded as a logical communication channel. For a practical application or deployment, the communication channel is not necessarily bounded or limited to one communication technology, e.g., Ethernet, fiber, wireless technologies, wide area or local area.

The communication interface is configured to transmit and receive data to and from other entities that are temporarily or permanently coupled to said edge cloud. The memory comprises code based on which the processor is configured to pretend to be at least one entity of a plurality of other entities that is temporarily or permanently coupled to said edge cloud. By pretending to be at least one entity of a plurality of other entities, the intrusion and anomaly detecting edge computing unit receives data, transmitted in said edge cloud, which is intended for being transmitted to the said at least one entity of the plurality of other entities. The processor is further configured to analyze received data for detecting anomalies and intrusions in the received data. If an anomaly and/or intrusion is detected in the received data, the processor is further configured to store information about the detected anomaly and/or intrusion in the memory and to transmit information about the detected anomaly and/or intrusion to at least one other anomaly and intrusion detecting edge computing unit of said edge cloud via the communication interface.

In an embodiment of the present invention, the other entity being one of a further intrusion and anomaly detecting edge computing unit of said edge cloud, a sensor temporarily or permanently coupled to said edge cloud, a vehicle temporarily or permanently coupled to said edge cloud, a vehicle component temporarily or permanently coupled to said edge cloud, a centralized cloud, and a traffic infrastructure unit temporarily or permanently coupled to said edge cloud. All the other entities may be temporarily or permanently coupled to said edge cloud. Thus, it is possible to receive multiple data to take them into account by detecting anomalies and/or intrusions in received data.

A fourth aspect of the invention is directed to a system for detecting intrusions and anomalies. The system comprises n edge clouds. Each of the n edge clouds comprises a plurality of distributed intrusion and anomaly detecting edge computing units as described above. A first plurality of distributed intrusion and anomaly detecting edge computing units as described above are coupled together and are part of a first edge cloud. An nth plurality of intrusion and anomaly detecting edge computing units as described above are coupled together and are part of an nth edge cloud. It is clear that n is a finite integer with n>1. The system bears the advantage of distributed anomaly and/or intrusion detection in many different edge clouds and analysis of received data using edge cloud processing power. Thus, for example latencies in detecting cyber-attacks and in reacting to cyber-attacks can be reduced.

In an embodiment of the present invention, the n edge clouds are managed so that each edge cloud spans a contiguous geographic area. For example, the centralized cloud may manage the edge clouds in such a way that each edge cloud spans a contiguous geographic area. For example, at least two distributed intrusion and anomaly detecting edge computing units may be permanently coupled together and being part of an edge cloud in such a way that they span a location-based monitoring range. Moreover, for example, distributed intrusion and anomaly detecting edge computing units of an edge cloud may be configured to be only able to pretend of being other entities in a defined contiguous geographic area. For example, each edge cloud may cover a certain region, e.g., spanning across multiple radio cells of a wide or local area network, including entire business premises, production sites, transport hubs, road segments, or geographic area defined by co-located mobile entities. Advantages of such an embodiment among others are an early containment of attacked/infected entities, e.g., vehicles or other mobile entities. Furthermore, local correlations in cyber-attacks may be exploited, the complexity of attack pattern recognition may be reduced, attacked and/or infected entities, e.g., attacked and/or infected vehicles may be identified faster. Furthermore, in managing edge clouds in such a way that each edge cloud spans a contiguous geographic area enables an easier and more precise monitoring of a moving attacker, e.g., an attacker inside a moving vehicle that attacks other vehicles or road side units, such as infrastructure units. In addition, the enforcement of countermeasures by intrusion and anomaly detecting edge computing units being configured to enforce countermeasures can also be initiated faster, e.g., by infrastructure units comprising intrusion and anomaly detecting edge computing units. Moreover, such an embodiment bears the advantage that the enforcement of appropriate countermeasures may be coordinated, e.g., in case of complex attack scenarios with multiple different, globally distributed attacks.

In an embodiment of the present invention, at least one of the intrusion and anomaly detecting edge computing units in each of the n edge clouds is coupled to at least one of the other n−1 edge clouds. By that an overlap of edge clouds can be created. This may be advantageous, for example, to share information about anomalies and/or intrusions with further intrusion and anomaly detecting edge computing units in one of the other n−1 edge clouds.

In an embodiment of the present invention, at least one of the intrusion and anomaly detecting edge computing units in each of the n edge clouds being configured to pretend of being at least one entity of a plurality of other entities being temporarily or permanently coupled to one of the other n−1 edge clouds to receive data transmitted in the said one of the other n−1 edge clouds that is intended for being transmitted to the said at least one entity of the plurality of other entities being temporarily or permanently coupled to said one of the other n−1 edge clouds. This embodiment also bears an advantage for sharing information about anomalies and/or intrusions with further intrusion and anomaly detecting edge computing units in one of the other n−1 edge clouds.

BRIEF DESCRIPTION OF THE DRAWINGS

Further features of the present invention will become apparent from the following description and the appended claims in conjunction with the figures.

DETAILED DESCRIPTION

For a better understanding of the principles of the present invention, embodiments of the invention will be explained in more detail below with reference to the figures. Like reference numerals are used in the figures for the same or equivalent elements and are not necessarily described again for each figure. It is to be understood that the invention is not limited to the illustrated embodiments and that the features described may also be combined or modified without departing from the scope of the invention as defined in the appended claims.

Figure 1:
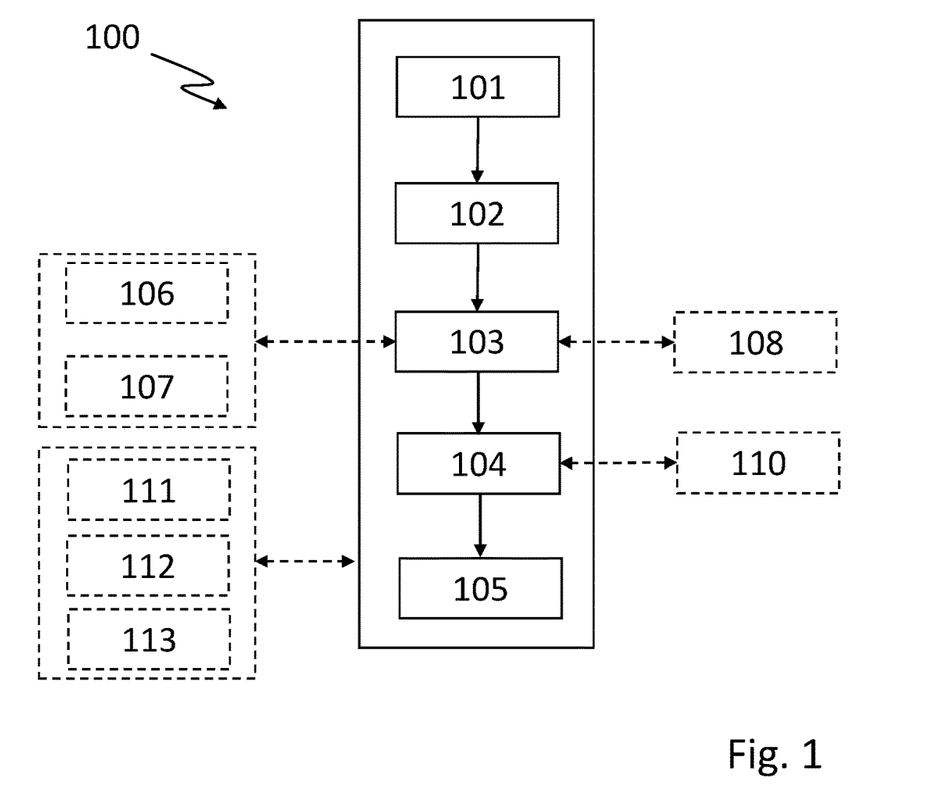
FIG. 1 is a flowchart of a method according to an embodiment of the invention.

FIG. 1 is a flowchart of a method 100 for detecting intrusions and anomalies according to an embodiment of the present application. The method is performed by an intrusion and anomaly detecting edge computing unit that is coupled together with at least one further intrusion and anomaly detecting edge computing unit. The at least two intrusion and anomaly detecting edge computing units form a plurality of coupled distributed intrusion and anomaly detecting edge computing units that are part of an edge cloud.

The method performed by the intrusion and anomaly detecting edge computing unit comprises a) transmitting and receiving data 101 to and from other entities that are temporarily or permanently coupled to said edge cloud. The method further comprises b) pretending 102 by the intrusion and anomaly detecting edge computing unit to be at least one entity of a plurality of other entities that are temporarily or permanently coupled to said edge cloud. By pretending to be at least one entity of a plurality of other entities said intrusion and anomaly detecting edge computing unit receives data transmitted in said edge cloud that is intended to be transmitted to the said at least one entity of the plurality of other entities that are temporarily or permanently coupled to said edge cloud. The method further comprises c) analyzing 103 received data for detecting anomalies and intrusions in the received data. If an anomaly and/or intrusion is detected in the received data the intrusion and anomaly detecting edge computing unit performs d) storing 104 information about the detected anomaly and/or intrusion and e) transmitting 105 information about the detected anomaly and/or intrusion to at least one other anomaly and intrusion detecting edge computing unit of said edge cloud.

Further details of the method 100 are explained in connection with the description of the following figures.

Figure 2:
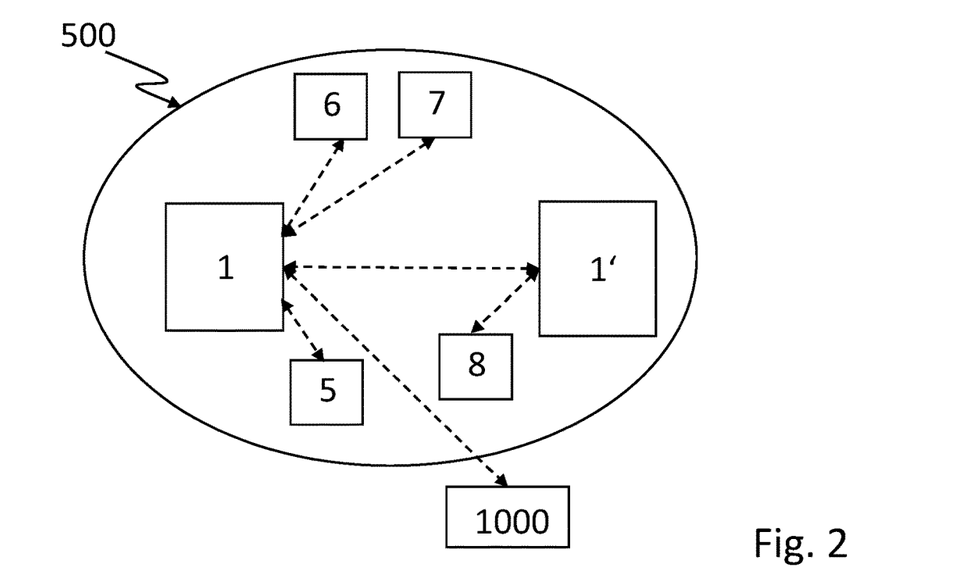
FIG. 2 shows a sketch of two intrusion and anomaly detecting edge computing units according to an embodiment of the invention.

FIG. 2 shows a sketch of two intrusion and anomaly detecting edge computing units that perform the method 100 as described in FIG. 1. The first intrusion and anomaly detecting edge computing unit 1 is coupled together with a second intrusion and anomaly detecting edge computing unit 1'. The two coupled distributed intrusion and anomaly detecting edge computing units 1, 1' are part of an edge cloud 500. Optionally, both intrusion and anomaly detecting edge computing units 1, 1' use code that comprises artificial intelligence based algorithms.

The two intrusion and anomaly detecting edge computing units 1, 1' are configured to a) transmit and receive data 101 to and from other entities 5, 6, 7, 8, 1000 that are temporarily or permanently coupled to the edge cloud 500. Other entities coupled to the edge cloud 500 are for example a vehicle 5, a camera 6 that is part of a video surveillance at a road junction, and a sensor 7 connected to a traffic light that is used to receive a signal of an ambulance vehicle and to influence a traffic light circuit for ambulance vehicles in such a way that the traffic light turns to green and the ambulance can cross, e.g., a road junction with the appropriate traffic light circuit, without any time delay. A further other entity is a centralized cloud 1000 in the backend and another camera 8 that is part of a video surveillance at another road junction.

In FIG. 2 the first intrusion and anomaly detecting edge computing unit 1 is configured to b) pretend 102 to be the camera 6 and to be the sensor 7 that are permanently coupled to the edge cloud 500. The first intrusion and anomaly detecting edge computing unit 1, thus, receives data that is transmitted to the camera 6 and the sensor 7.

For example, the first intrusion and anomaly detecting edge computing unit 1 may be configured in this way because it is deployed closer to the camera 6 and the sensor 7 in terms of latencies. For example, the centralized cloud 1000 can manage responsibility of distributed intrusion and anomaly detecting edge computing units 1, 1' for other entities 5, 6, 7 connected to the edge cloud 500 with regard to latencies.

For example, vehicle 5 may spoof an ambulance signal, for example an ambulance ID, in order to influence the traffic light for which the first intrusion and anomaly detecting edge computing unit 1 is responsible for, e.g., responsibility determined by the centralized cloud 1000.

The first intrusion and anomaly detecting edge computing unit 1, by pretending to be the camera 6 and the sensor 7, receives data that is transmitted to the respective other entities 6, 7. The first intrusion and anomaly detecting edge computing unit 1 thus receives a signal from the sensor 7 that the traffic light is forced to turn to green, e.g., on request of an ambulance vehicle.

The first intrusion and anomaly detecting edge computing unit 1 analyzes 103 the received data for detecting anomalies and intrusions. For example, the first intrusion and anomaly detecting edge computing unit 1 may detect an anomaly in the received data, e.g., because the received ID is already registered as being a spoofed ID in a memory of the first intrusion and anomaly detecting edge computing unit 1. Optionally, the respective intrusion and anomaly detecting edge computing unit 1, 1' may use 107 stored information in c) analyzing 103 by taking stored information into account for detecting anomalies and intrusions in received data.

Another example is that the first intrusion and anomaly detecting edge computing unit 1 may detect an intrusion in the sensor 7 or the traffic light itself, for manipulating the traffic light to turn to green.

Optionally, the first intrusion and anomaly detecting edge computing unit 1 is configured to compare 106 the received data from the sensor 7 and the received data from the camera 6. By comparing 106 the received data, the first intrusion and anomaly detecting edge computing unit 1 may, for example, recognize that the sensor 7 shows a correct ambulance ID for turning the traffic light to green, but the camera 6 recognizes a civil vehicle 5 instead of an expected ambulance vehicle. An anomaly is, thus, detected by the first intrusion and anomaly detecting edge computing unit 1. The first intrusion and anomaly detecting edge computing unit 1 then stores 104 the information about the detected anomaly and transmits 105 the information about the detected anomaly to the second intrusion and anomaly detecting edge computing unit 1' of the edge cloud 500. For example, the information may include the nature of the anomaly and/or intrusion, e.g., information that an ambulance ID is spoofed. Additionally, the information may comprise information about the ID spoofing vehicle 5, for example, information from the camera 6 showing the color of the vehicle, the vehicle registration number, anticipated driving direction, and so on.

The second intrusion and anomaly detecting edge computing unit 1' after receiving the information about the detected anomaly may decide to store the information, for example, based on whether the second intrusion and anomaly detecting edge computing unit 1' already received same information and/or a storage of the second intrusion and anomaly detecting edge computing unit 1' comprises same information. After storing the information about the detected anomaly, the second intrusion and anomaly detecting edge computing unit 1' may use 107 the stored information by taking stored information into account for detecting anomalies and intrusions in received data.

Optionally, the first and second intrusion and anomaly detecting edge computing units 1, 1' are configured to enforce 111 a countermeasure based on the detected anomaly and/or intrusion. For example, as countermeasures of the above-mentioned scenario of the detected anomaly in the sensor 7 data of the ambulance ID and the recognition of camera 6 of the civil vehicle, the first intrusion and anomaly detecting edge computing unit 1 may set the spoofed ID on a blacklist, block the communication of the civil vehicle 5 transmitting the spoofed ID connected to the edge cloud 500, e.g., by revocation of certificates or public keys used for transmitting data to other entities connected to the edge cloud 500, and set a marker on the civil vehicle 5 spoofing the ambulance ID. If a countermeasure was enforced by an intrusion and anomaly detecting edge computing unit, information about the detected anomaly and/or intrusion may comprise information about the enforced countermeasure, for example, that the spoofed ID is set on a blacklist, that the communication of the vehicle 5 transmitting the spoofed ID is blocked, and that a marker is set on the civil vehicle 5 spoofing the ambulance ID.

The first intrusion and anomaly detecting edge computing unit 1 may derive 108 an attack pattern from analyzed data. The stored and transmitted information about the detected anomaly and/or intrusion then comprises the derived attack pattern.

The vehicle 5 spoofing the ID may drive out of an area of responsibility of the first intrusion and anomaly detecting edge computing unit 1, but drive into the direction of an area of responsibility of the second intrusion and anomaly detecting edge computing unit 1'. The first intrusion and anomaly detecting edge computing unit 1, e.g., by setting the marker as countermeasure, may track that the ID spoofing vehicle 5 drives into the direction of the area of responsibility of the second intrusion and anomaly detecting edge computing unit

1' and may warn the second intrusion and anomaly detecting edge computing unit 1' by transmitting respective information.

The second intrusion and anomaly detecting edge computing unit 1' receives the information from the first intrusion and anomaly detecting edge computing unit 1 and may decide to store the information and take the stored information into account for analyzing received data. The second intrusion and anomaly detecting edge computing unit 1', from the received information, further recognizes that the ID spoofing vehicle 5 drives into its direction and may, in advance, prepare a countermeasure, e.g., in order to, as soon as detecting the respective ID spoofing vehicle 5 in its area of responsibility, block the communication of the ID spoofing vehicle 5. For example, the second intrusion and anomaly detecting edge computing unit 1', by pretending of being camera 8 in its area of responsibility, may receive data intended for camera 8 indicating that the ID spoofing vehicle 5 entered the area of responsibility of the second intrusion and anomaly detecting edge computing unit 1'.

After handing over the responsibility for the ID spoofing vehicle 5 to the second intrusion and anomaly detecting edge computing unit 1', the first intrusion and anomaly detecting edge computing unit 1, can optionally use 110 stored information to derive new attack patterns. If the first intrusion and anomaly detecting edge computing unit 1 derives a new attack pattern from stored information, it stores the new attack pattern and transmits the new attack pattern to at least one other anomaly and intrusion detecting edge-computing unit of the edge cloud 500, e.g., the second intrusion and anomaly detecting edge computing unit 1'. For example, meanwhile the first intrusion and anomaly detecting edge computing unit 1 may have received further information about the ID spoofing vehicle 5 that may be taken into account for deriving an attack pattern.

Optionally, the first and second intrusion and anomaly detecting edge computing units 1, 1' are configured to share 112 computing power with at least one further intrusion and anomaly detecting edge computing unit 1, 1', i.e., the respective other intrusion and anomaly detecting edge computing unit 1, 1', of the edge cloud 500 for analyzing 103 received data together, if a certain first time limit and/or a certain first computational load limit is exceeded during the analysis of the received data.

Additionally, optionally, the first and second intrusion and anomaly detecting edge computing units 1, 1' are configured to forward 113 preprocessed data to the centralized cloud 1000, if a certain second time limit and/or a certain second computational load limit is exceeded during the analysis of the received data. For example, if no appropriate countermeasure can be found to answer an intrusion and/or anomaly. Another example is if the first and second intrusion and anomaly detecting edge computing units 1, 1' already shared 112 computing power for analyzing 103 received data together and if already the certain first time limit and/or the certain first computational load limit is exceeded during the analysis of the received data, it may be decided to forward 113 preprocessed data to the centralized cloud 1000, if also the certain second time limit is exceeded during the shared analysis of the received data. The centralized cloud 1000 may then analyze the preprocessed data in the backend and processing power of the first and/or the second intrusion and anomaly detecting edge computing units 1, 1' is not blocked to detect further anomalies and or intrusions.

Figure 3:
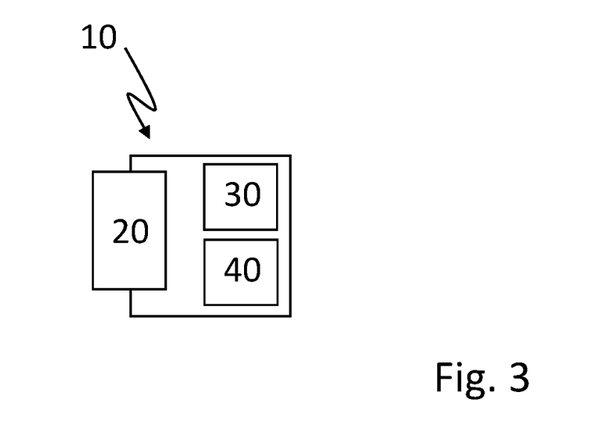
FIG. 3 shows a sketch of another embodiment of an intrusion and anomaly detecting edge computing unit according to the invention.

FIG. 3 shows another embodiment of an intrusion and anomaly detecting edge computing unit 10. The edge computing unit 10 comprises a communication interface 20, a memory 30 and a processor 40. The communication interface 20 is configured to transmit and receive data to and from other entities (not shown) that are temporarily or permanently coupled to an edge cloud (not shown), in which the intrusion and anomaly detecting edge computing unit 10 is part of and in which the intrusion and anomaly detecting edge computing unit 10 is coupled together with at least one further intrusion and anomaly detecting edge computing unit (not shown). The memory 30 of the shown intrusion and anomaly detecting edge computing unit 10 comprises code and data that gets processed. Based on the code, the processor 40 is configured to i) pretend to be at least one entity of a plurality of other entities that are temporarily or permanently coupled to said edge cloud. By pretending of being another entity of the edge cloud, the intrusion and anomaly detecting edge computing unit 10 receives data transmitted in said edge cloud that is intended to be transmitted to the said at least one entity of the plurality of other entities. Based on the code, the processor 40 is further configured to ii) analyze received data for detecting anomalies and intrusions in the received data. If an anomaly and/or intrusion is detected in the received data, based on the code the processor 40 is configured to iii) store information about the detected anomaly and/or intrusion in the memory 30 and to iv) transmit information about the detected anomaly and/or intrusion to at least one other anomaly and intrusion detecting edge computing unit (not shown) of said edge cloud (not shown) via the communication interface 20.

Figure 4:
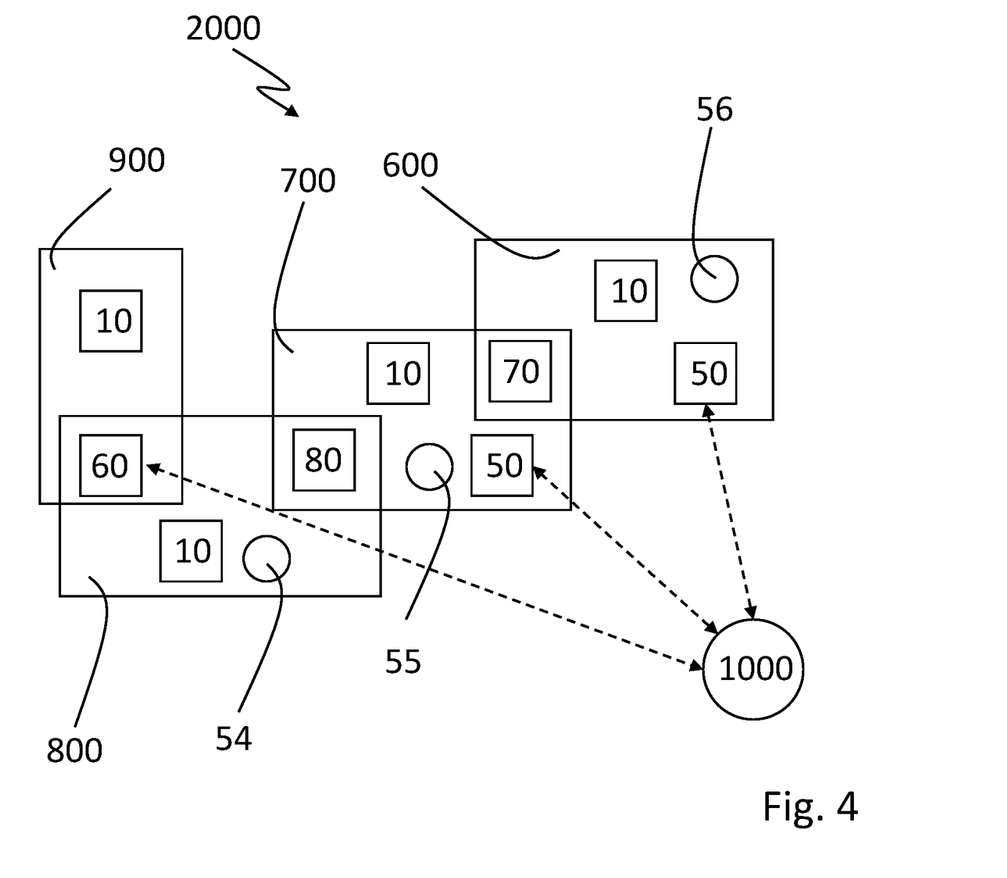
FIG. 4 shows a sketch of a system according to an embodiment of the invention.

FIG. 4 is a sketch of a system 2000 for detecting intrusions and anomalies according to an embodiment of the invention.

The System 2000 shown in FIG. 4 comprises four edge clouds 600, 700, 800, 900, a first edge cloud 600, a second edge cloud 700, a third edge cloud 800 and a fourth edge cloud 900.

The first edge cloud 600 comprises three distributed intrusion and anomaly detecting edge computing units 10, 50, 70. The three distributed intrusion and anomaly detecting edge computing units 10, 50, 70 as part of the first edge cloud 600 are coupled together.

The second edge cloud 700 comprises four distributed intrusion and anomaly detecting edge computing units 10, 50, 70, 80. The four distributed intrusion and anomaly detecting edge computing units 10, 50, 70, 80 as part of the second edge cloud 700 are coupled together.

The third edge cloud 800 comprises three distributed intrusion and anomaly detecting edge computing units 10, 60, 80. The three distributed intrusion and anomaly detecting edge computing units 10, 60, 80 as part of the third edge cloud 800 are coupled together.

The fourth edge cloud 900 comprises two distributed intrusion and anomaly detecting edge computing units 10, 60. The two distributed intrusion and anomaly detecting edge computing units 10, 60 as part of the first edge cloud 900 are coupled together.

Each of the four edge clouds 600, 700, 800, 900 comprise a distributed intrusion and anomaly detecting edge computing unit 10 as described in FIG. 3. The further distributed intrusion and anomaly detecting edge computing units 50, 60, 70, 80 are configured to perform a method as described in FIG. 1. All the distributed intrusion and anomaly detecting edge computing units 10, 50, 60, 70, 80 are organized in a hierarchical manner such that for example only one of the distributed intrusion and anomaly detecting edge computing units 50, 60 is allowed to transmit and receive data to and from the centralized cloud 1000 in the backend. The centralized cloud 1000 may, for example, distribute updates for a code, attack patterns and/or countermeasures to the respective distributed intrusion and anomaly detecting edge computing units 50, 60. The distributed intrusion and anomaly detecting edge computing units 50, 60 then may decide to distribute the respective updates to further distributed intrusion and anomaly detecting edge computing units 10, 70, 80 of the respective edge clouds 600, 700, 800, 900.

In each of the four edge clouds 600, 700, 800, 900 two intrusion and anomaly detecting edge computing units are permanently coupled together and are a permanent part of the respective edge cloud. The four edge clouds 600, 700, 800, 900 are managed in such a way that each edge cloud spans a contiguous geographic area.

Furthermore, in the first edge cloud 600, one of the intrusion and anomaly detecting edge computing units 70 is additionally coupled to the second edge cloud 700. Another one of the intrusion and anomaly detecting edge computing units 80 of the second edge cloud 700 is coupled to the third edge cloud 800. And the third edge cloud comprises a further intrusion and anomaly detecting edge computing unit 60 that is coupled to the fourth edge cloud 900.

The one intrusion and anomaly detecting edge computing unit 60 that is coupled to the third edge cloud 800 and the fourth edge cloud 900 is additionally configured to pretend of being at least one entity of a plurality of other entities (not shown) being temporarily or permanently coupled to one of the other two edge clouds 600, 700 to which the respective one intrusion and anomaly detecting edge computing unit 60 is not connected to. In that the respective one intrusion and anomaly detecting edge computing unit 60 receives data transmitted in the said one of the other two edge clouds 600, 700 that is intended to be transmitted to the said at least one entity of the plurality of other entities being temporarily or permanently coupled to said one of the other two edge clouds 600, 700.

A vehicle 56 with a malicious actor, in the following attacking vehicle 56, may use a remote attack, e.g., via WiFi, on other vehicles 54, 55, a first infected vehicle 54 and a second infected vehicle 55. The infected vehicles 54, 55 further spread data comprising anomalies and or intrusions in respective edge clouds to which they are temporarily coupled.

Because the attacking vehicle 56 and for example no data comprising video surveillance is available it is difficult to directly identify the attacking vehicle 56.

With regard to such a scenario, the four edge clouds 600, 700, 800, 900 may be managed in such a way that each edge cloud spans a contiguous geographic area. For example, the centralized cloud 1000 may manage the four edge clouds 600, 700, 800, 900 in such a way that each edge cloud spans a contiguous geographic area. For example, respective distributed intrusion and anomaly detecting edge computing units of a respective edge cloud are configured to be only able to pretend of being other entities in a defined contiguous geographic area of that edge cloud.

In the scenario of the moving attacking vehicle 56, on its way from the third edge cloud 800, over the second edge cloud 700, to the first edge cloud 600, the moving attacking vehicle 56 first infects the first vehicle 54 connected to the third edge cloud 800. After some time and after reaching the second edge cloud 700, the attacking vehicle 56 further infects the second vehicle 55 connected to the second edge cloud 700. By analyzing data received from the respective vehicles and/or other infected entities in the infrastructure and by sharing information about anomalies and/or intrusions, the third and second edge cloud 800, 700 may find out that there are correlations in the data received from the first and second infected vehicle 54, 55. For example, by analyzing the time which vehicle was infected first, e.g., by comparing the respective data and by analyzing the geographical area, where the respective vehicles have been infected, a time and/or geographical development of the attack can be identified. By identifying the time and/or geographical development of the attack, it is possible to trace back to the source of the attack, i.e., to the attacking vehicle 56. For example, the intrusion and anomaly detecting edge computing unit 70 that is coupled to both, the second edge cloud 700 and the first edge cloud 600 may thus inform the other intrusion and anomaly detecting edge computing units 10, 50 coupled to the first edge cloud 600 that the attacking vehicle entered the geographical area of responsibility of the first edge cloud 600 and thus of respective intrusion and anomaly detecting edge computing units 10, 50, 70 coupled to the first edge cloud 600.

An appropriate countermeasure with regard to the attacking vehicle 56, enforced by a respective intrusion and anomaly detecting edge computing unit in the first edge cloud 600 is to directly block the attacker at an access point of a network. Hence, the edge-computing infrastructure components may directly block the attacker's signal and report him. Based on the report information of each node in proximity of the attacker a localization and tracing of the attacker becomes feasible. In addition, a tracing of possible victims and a blocking of commands in the area where the attack is taking place is also feasible, e.g., in the area of responsibility of the first edge cloud 600, in the area of responsibility of the second edge cloud 700 and in the area of responsibility of the third edge cloud 800. In this scenario, the centralized backend 1000 is only coordinating the intrusion and anomaly detecting edge computing units 10, 50, 60, 70, 80, e.g., infrastructure components with intrusion and anomaly detecting edge computing units 10, 50, 60, 70, 80, while each intrusion and anomaly detecting edge computing unit 10, 50, 60, 70, 80 is analyzing received data and deploying/enforcing counteractions by itself. Hence, the computational overhead in the backend is reduced and more parallel attacks can be handled and orchestrated by a centralized backend 1000, e.g., a security operation center in the backend.

The invention claimed is:

1. A method for detecting intrusions and anomalies by an intrusion and anomaly detecting edge computing unit, being coupled together with at least one further intrusion and anomaly detecting edge computing unit to form a plurality of coupled distributed intrusion and anomaly detecting edge computing units, the plurality of coupled distributed intrusion and anomaly detecting edge computing units being part of an edge cloud, the method comprising:
transmitting and receiving data to and from other entities being temporarily or permanently coupled to said edge cloud,
pretending to be at least one entity of a plurality of other entities being temporarily or permanently coupled to the edge cloud to receive data transmitted in the edge cloud that is intended for being transmitted to the said at least one entity of the plurality of other entities being temporarily or permanently coupled to the edge cloud,
analyzing received data for detecting anomalies and intrusions in the received data by comparing data received from at least two other entities being temporarily or permanently coupled to the edge cloud, and
if at least one of an anomaly and an intrusion is detected in the received data:

storing information about the at least one of a detected anomaly and a detected intrusion and transmitting information about the at least one of a detected anomaly and a detected intrusion to at least one other anomaly and intrusion detecting edge-computing unit of said edge cloud.

2. The method according to claim 1, further comprising: using stored information in analyzing received data for detecting anomalies and intrusions in the received data by taking stored information into account for detecting anomalies and intrusions in the received data.

3. The method according to claim 1, further comprising: deriving an attack pattern from analyzed data.

4. The method according to claim 1, further comprising: at least one of using code comprising artificial intelligence based algorithms and using code comprising reinforcement learning based algorithms.

5. The method according to claim 1, further comprising: using stored information to derive new attack patterns, and if a new attack pattern is derived from stored information; storing the new attack pattern and transmitting the new attack pattern to at least one other anomaly and intrusion detecting edge-computing unit of the edge cloud.

6. The method according to claim 1, further comprising: enforcing, by at least one of the distributed intrusion and anomaly detecting edge computing units, a countermeasure based on the at least one of a detected anomaly and a detected intrusion.

7. The method claim 1, further comprising: if at least one of a certain first time limit and a certain first computational load limit is exceeded during the analysis of the received data;
sharing computing power with at least one further intrusion and anomaly detecting edge computing unit of the edge cloud for analyzing received data together.

8. The method according to claim 7, further comprising: if at least one of a certain second time limit and a certain second computational load limit is exceeded during the analysis of the received data;
forwarding preprocessed data to a centralized cloud for the centralized cloud to detect anomalies and intrusions in the received data based on the forwarded preprocessed data.

9. An intrusion and anomaly detecting edge computing unit coupled together with at least one further intrusion and anomaly detecting edge computing unit to form a plurality of coupled distributed intrusion and anomaly detecting edge computing units, the plurality of coupled distributed intrusion and anomaly detecting edge computing units being part of an edge cloud, the edge computing unit comprising:
a communication interface, a memory and a processor,
the communication interface being configured to transmit and receive data to and from other entities being temporarily or permanently coupled to the edge cloud,
the memory comprising code based on which the processor being configured to:
pretend to be at least one entity of a plurality of other entities being temporarily or permanently coupled to the edge cloud to receive data transmitted in the edge cloud that is intended for being transmitted to the at least one entity of the plurality of other entities,
analyze received data for detecting anomalies and intrusions in the received data by comparing data received from at least two other entities being temporarily or permanently coupled to the edge cloud, and
if at least one of an anomaly and an intrusion is detected in the received data:
store information about the at least one of a detected anomaly and a detected intrusion in the memory and
transmit information about the at least one of a detected anomaly and a detected intrusion to at least one other anomaly and intrusion detecting edge computing unit of the edge cloud via the communication interface.

10. The intrusion and anomaly detecting edge computing unit according to claim 9, the other entity being one of a further intrusion and anomaly detecting edge computing unit of the edge cloud, a sensor temporarily or permanently coupled to the edge cloud, a vehicle temporarily or permanently coupled to the edge cloud, a vehicle component temporarily or permanently coupled to the edge cloud, a centralized cloud, and a traffic infrastructure unit temporarily or permanently coupled to the edge cloud.

11. A system for detecting intrusions and anomalies, the system comprising:
n edge clouds,
a first plurality of distributed intrusion and anomaly detecting edge computing units each comprising:
a communication interface, a memory, and a processor,
the communication interface being configured to transmit and receive data to and from other entities being temporarily or permanently coupled to said edge cloud,
the memory comprising code based on which the processor being configured to:
pretend to be at least one entity of a plurality of other entities being temporarily or permanently coupled to said edge cloud to receive data transmitted in said edge cloud that is intended for being transmitted to the at least one entity of the plurality of other entities,
analyze received data for detecting anomalies and intrusions in the received data by comparing data received from at least two other entities being temporarily or permanently coupled to the edge cloud, and
if an at least one of an anomaly and an intrusion is detected in the received data:
store information about the at least one of a detected anomaly and a detected intrusion in the memory and
transmit information about the at least one of a detected anomaly and a detected intrusion to at least one other anomaly and intrusion detecting edge computing unit of said edge cloud via the communication interface,
the first plurality of distributed intrusion and anomaly detecting edge computing units being part of a first edge cloud and
an nth plurality of intrusion and anomaly detecting edge computing units each comprising:
a communication interface, a memory, and a processor,
the communication interface being configured to transmit and receive data to and from other entities being temporarily or permanently coupled to said edge cloud,
the memory comprising code based on which the processor being configured to:
pretend to be at least one entity of a plurality of other entities being temporarily or permanently coupled to said edge cloud to receive data transmitted in said edge cloud that is intended for being transmitted to the at least one entity of the plurality of other entities,
analyze received data for detecting anomalies and intrusions in the received data by comparing data received from at least two other entities being temporarily or permanently coupled to the edge cloud, and
if at least one of an anomaly and an intrusion is detected in the received data:

store information about the at least one of a detected anomaly and a detected intrusion in the memory and transmit information about the at least one of a detected anomaly and a detected intrusion to at least one other anomaly and intrusion detecting edge computing unit of said edge cloud via the communication interface, the nth plurality of distributed intrusion and anomaly detecting edge computing units being coupled together and being part of an nth edge cloud.

12. The system according to claim 11, the n edge clouds being managed so that each edge cloud spans a geographic area that is contiguous with a geographic area spanned by at least one other of the n edge clouds.

13. System according to claim 11, at least one of the intrusion and anomaly detecting edge computing units in each of the n edge clouds being coupled to at least one of the other n−1 edge clouds.

14. The system according to claim 11, at least one of the intrusion and anomaly detecting edge computing units in each of the n edge clouds being configured to;

pretend to be at least one entity of a plurality of other entities being temporarily or permanently coupled to one of the other n−1 edge clouds to receive data transmitted in the one of the other n−1 edge clouds that is intended for being transmitted to the said at least one entity of the plurality of other entities being temporarily or permanently coupled to the one of the other n−1 edge clouds.

15. The system for detecting intrusions and anomalies according to claim 11, wherein, for both the first plurality of distributed intrusion and anomaly detecting edge computing units and the nth plurality of intrusion and anomaly detecting edge computing units, the other entity is one of a further intrusion and anomaly detecting edge computing unit of the edge cloud, a sensor temporarily or permanently coupled to the edge cloud, a vehicle temporarily or permanently coupled to the edge cloud, a vehicle component temporarily or permanently coupled to the edge cloud, a centralized cloud, and a traffic infrastructure unit temporarily or permanently coupled to the edge cloud.

* * * * *